United States Patent [19]

Measor

[11] Patent Number: 4,964,116
[45] Date of Patent: Oct. 16, 1990

[54] DS3 - LINE INTERFACE LINEAR ARRAY (LILA)

[75] Inventor: Grahame Measor, Gaithersburg, Md.

[73] Assignee: ANT Nachrichtentechnik GmbH, Backnang, Fed. Rep. of Germany

[21] Appl. No.: 266,082

[22] Filed: Nov. 2, 1988

[51] Int. Cl.$^5$ .............................................. H04B 3/00
[52] U.S. Cl. ...................................... 375/11; 379/394
[58] Field of Search ........................ 375/11, 36, 12, 14, 375/60; 379/394, 398, 390, 414; 333/28, 17, 18; 328/173, 175; 455/69

[56] References Cited

U.S. PATENT DOCUMENTS

| | | | |
|---|---|---|---|
| 3,568,100 | 3/1971 | Torbos | 333/18 |
| 3,578,914 | 5/1971 | Simond | 333/18 |
| 3,671,886 | 6/1972 | Fudemoto et al. | 333/18 |
| 4,555,788 | 11/1985 | Merril | 371/11 |
| 4,686,686 | 8/1987 | Nakayama et al. | 375/11 |
| 4,785,265 | 11/1988 | Molnar et al. | 333/18 |
| 4,827,505 | 4/1989 | Takato et al. | 379/413 |

OTHER PUBLICATIONS

EXAR Corporation Catalog, pp. 1-448; 1-449; 1-450; 1-451; 1-428; 1-429; 1-438; 1-439, Mar. 1985.

Primary Examiner—Benedict V. Safourek
Assistant Examiner—Tesfalde Bocure
Attorney, Agent, or Firm—Spencer & Frank

[57] ABSTRACT

In a line interface circuit for binary data signals means are provided for compensating varying lengths of line in the receiving and/or transmission path. The output signal of a line equalizer controls a variable impedance circuit in such a way that attenuation of a line build out network is reduced if the output level of the line equalizer falls below a threshold. A transmit line build out network provides a frequency dependent attenuation of binary data by means of a control circuit, which supplies discrete attenuation values according to a logic word.

13 Claims, 8 Drawing Sheets

DS3 - LINE INTERFACE LINEAR ARRAY (LILA)

BACKGROUND OF THE INVENTION

The present invention relates to a line interface circuit for binary data having a receiver and/or transmitter, especially to a DS3-line Interface Linear Array (LILA).

Line interface circuits are necessary to connect trunk lines to a switching matrix. These circuits perform the function of receiving and/or transmitting data frames, e.g. 44.736 Mb/s DS3 data streams, and of reformatting the frames for transmission over high speed digital buses to the switching matrix. Such z line interface circuit also handles clock regeneration, line impedance matching, line build out and equalization functions.

An application note of EXAR Corporation of March 1985 discloses on pages 1-449 and 1-451 PCM Line Receiver and Clock Recovery Circuits which provide circuitry required to perform automatic line build out (ALBO). Amplitude equalization cf received line signals is achieved through shaping the frequency spectrum with the help of variable impedance ALBC ports. Clock recovery is done by an LC tank circuit.

SUMMARY OF THE INVENTION

It is an object of this invention to provide a line interface circuit which can be used for variable lengths of line. Another object of the invention is to provide a flexible line interface circuit, able to interface any bipolar signal at line rates up to 50 Mb/s. A further object of this invention is to provide a line interface circuit which meets the requirements of the technical advisory TA-TSY-000009 for the bipolar DS3 signals.

The invention is characterized by the features of the claims.

The line interface circuit according to the invention has the following advantages:

DS3 line receive and transmit functions can be realized in one integrated circuit, meeting the requirements of TA-TSY-000009, automatic receive line build out for up to 900 ft of cable is achieved, only few external components are necessary, built in transmit line build out functions for up to 900 ft of cable require no relays or plug in modules.

DETAILED DESCRIPTION OF THE INVENTION

Figure 1:
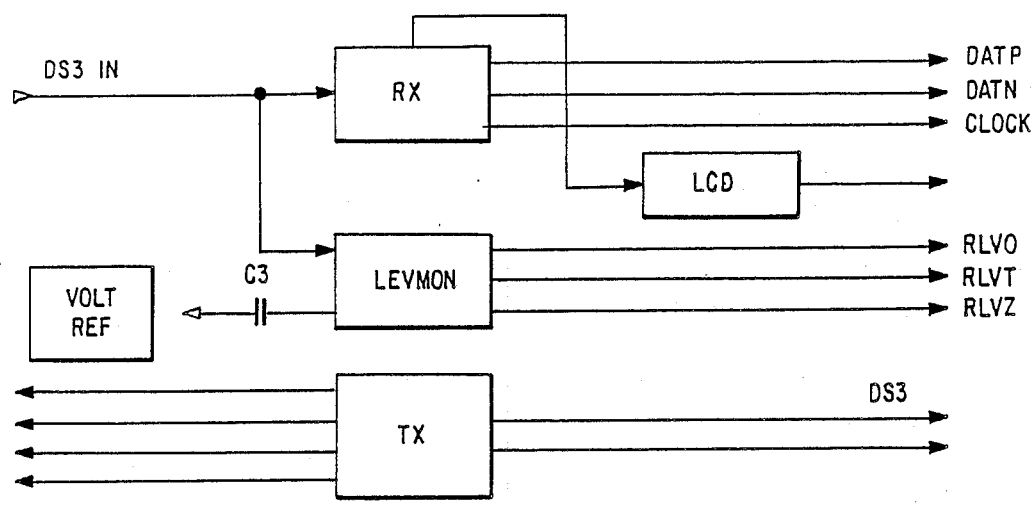
FIG. 1 is a block diagram of the line interface.

As shown in FIG. 1 the line interface consists of two distinct functional blocks, a receiver circuit RX and a transmit circuit TX along with other lesser blocks: a loss of clock detector LCD, a voltage reference VOLTREF and a level monitor LEVMON. The receiver RX converts a standard bipolar 44.736 Mb/s DS3 signal, received from up to 900 ft of cable from a DSX-3 crossconnect, into a "two rail" logic level signal DATN, DATP plus the clock.

Figure 2:
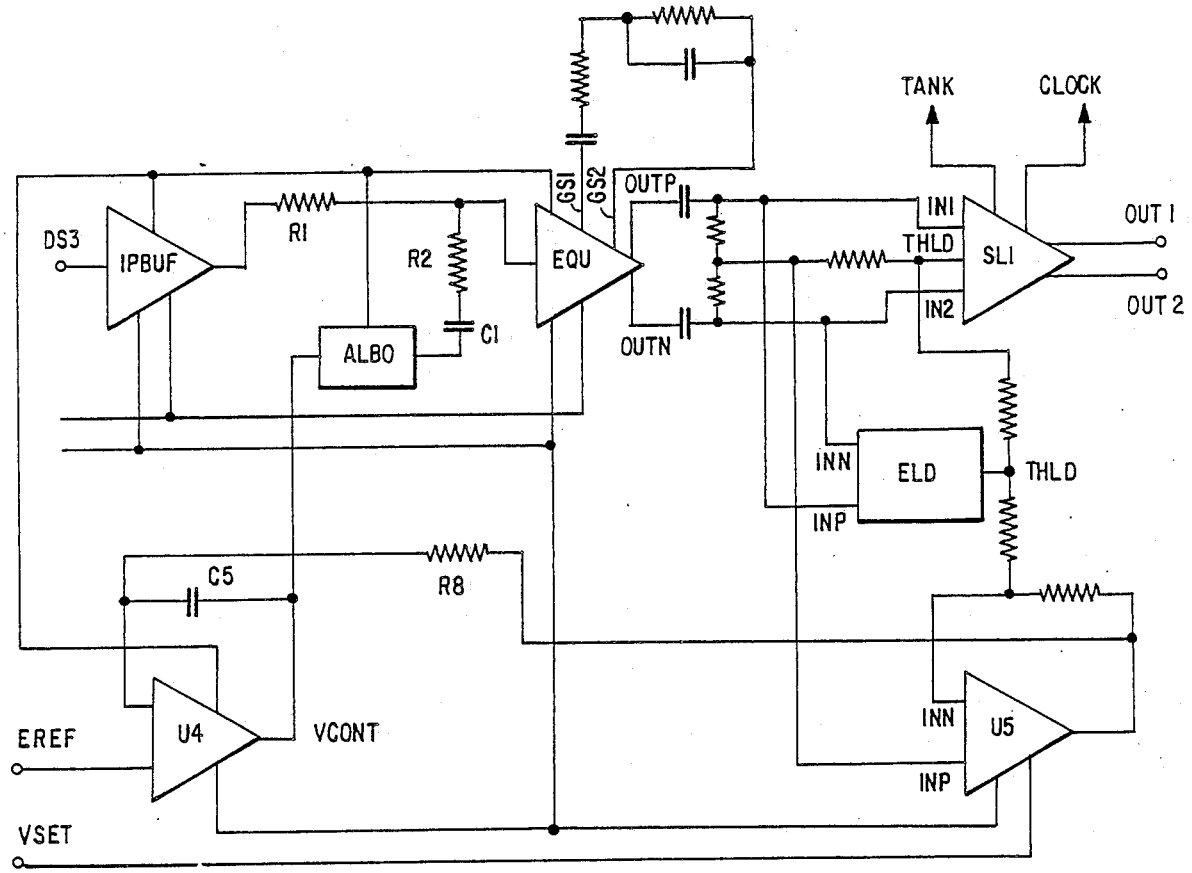
FIG. 2 is a block diagram of the receiver circuits.

Details of the receiver circuits are shown in FIG. 2. The DS3 signal is fed to an input buffer stage IPBUF which can be a state of art emitter follower or an operational amplifier. Tie output signal of the input buffer stage IPBUF is fed to a line equalizer EQU, e.g. a differential video amplifier similar to the LM 592 standard video amplifier, via a frequency selective divider stage FSDS consisting of a serial resistor R1, a shunt resistor R2 and a capacitor C1 series connected to the shunt resistor R2.

Via the shunt resistor R2 and the capacitor C1 the output signal of an automatic line build out network ALBO is fed frequency selective to the input of the equalizer. The ALBO network compensates for varying lengths of line controlled by a variable impedance. The amplitude characteristics of the equalizer versus frequency can be adjusted by a state of art network connected in the feedback path of the differential amplifier between pins GS1 and GS2.

Figure 3:
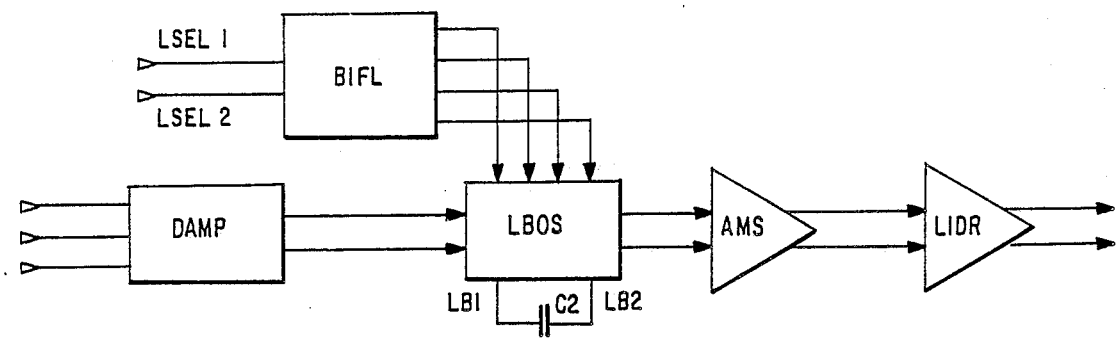
FIG. 3 is a block diagram of the transmitter circuits.

The equalized signal is then sliced, converted into logic levels and used to pump current pulses into a tank circuit TANK. The tank circuit will then ring and thus recover the clock frequency of the data in the DS3 signal. The slicer and tank circuit SLI is a double comparator and a current pulsing circuit to drive the tank. The transmitter TX converts the "two rail" logic representation of the DS3 signal plus clock into a bipolar signal, as shown in FIG. 3, by means of a data amplifier DAMP, capable of driving up to 900 ft of cable to a DSX-3 crossconnect. A binary to four line converter BIFL converts a two bit logic voltage fed in through pins LSEL1 and LSEL2 into a current on one of four lines depending on the logic word as follows:

| INPUT VOLTAGE | | OUTPUTS CURRENT (μA) | | | |
| --- | --- | --- | --- | --- | --- |
| LBOSEL0 | LBOSEL1 | "00" | "01" | "10" | "11" |
| 0 to 1 | 0 to 1 | 50 | 0 | 0 | 0 |
| 3 to 5 | 0 to 1 | 0 | 50 | 0 | 0 |
| 0 to 1 | 3 to 5 | 0 | 0 | 50 | 0 |
| 3 to 5 | 3 to 5 | 0 | 0 | 0 | 50 |

The line build out block LBOS selects one of four attenuations depending upon which current input is flowing. The attenuations are as follows: 0dB, 3dB, 6dB and 9dB. The frequency at which the attenuation has effect is determined by a capacitor C2 across terminals LB1 and LB2. After attenuation the LBOS circuitry also amplifies all frequencies up to 100MHz by about 6dB.

An amplifier stage AMS amplifies the output signal of the line build out block LBOS by about 10 dB. A line driver LIDR buffers the amplified signal to drive up to 50mA into a transformer.

As further shown in FIG. 1, the received DS3 signal is routed to the level monitor LEVMON. The level monitor LEVMON stores the peak values of the DS3 signal on a capacitor C3. The peak voltage then goes into a three level comparator. This comparator gives three output signals that indicate the level of the received signal. The signals change from a logic "one" to a logic "zero" when the input peak level goes above the threshold set for that output. The nominal thresholds are set so that a logic "1" at the output pins RLV0, RLV1, RLV2 indicates the following:
RLV0 a cable length greater than 675 ft is connected,
RLV1 a cable length greater than 450 ft is connected,
RLV2 a cable length greater than 225 ft is connected.

Figure 4:
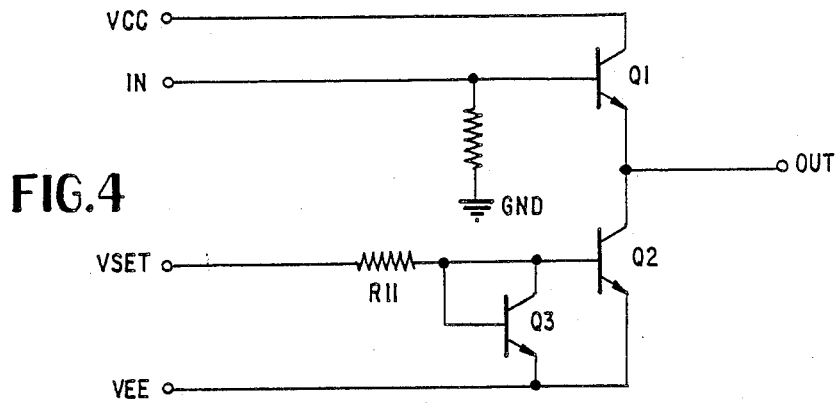
FIG. 4 is a circuit diagram of the input buffer stage.

The circuitry of the receiver RX including the ALBO control loop is now explained in more detail. The input buffer stage IPBUF shown in FIG. 4 is an emitter follower transistor Q1 with an approximately 2mA current source, transistors Q2 and Q3, which are used as a pull down. The current source uses a VSET voltage, which is setup by a band gap reference, to produce a 2mA current through resistor R1 and transistor Q3 thus mirroring that current in transistor Q2. The current is set to 2mA so that when the load is supplying its maximum expected current back into the current source there s sufficient current flowing through transistor Q1 to keep its emitter resistance low.

Figure 5:
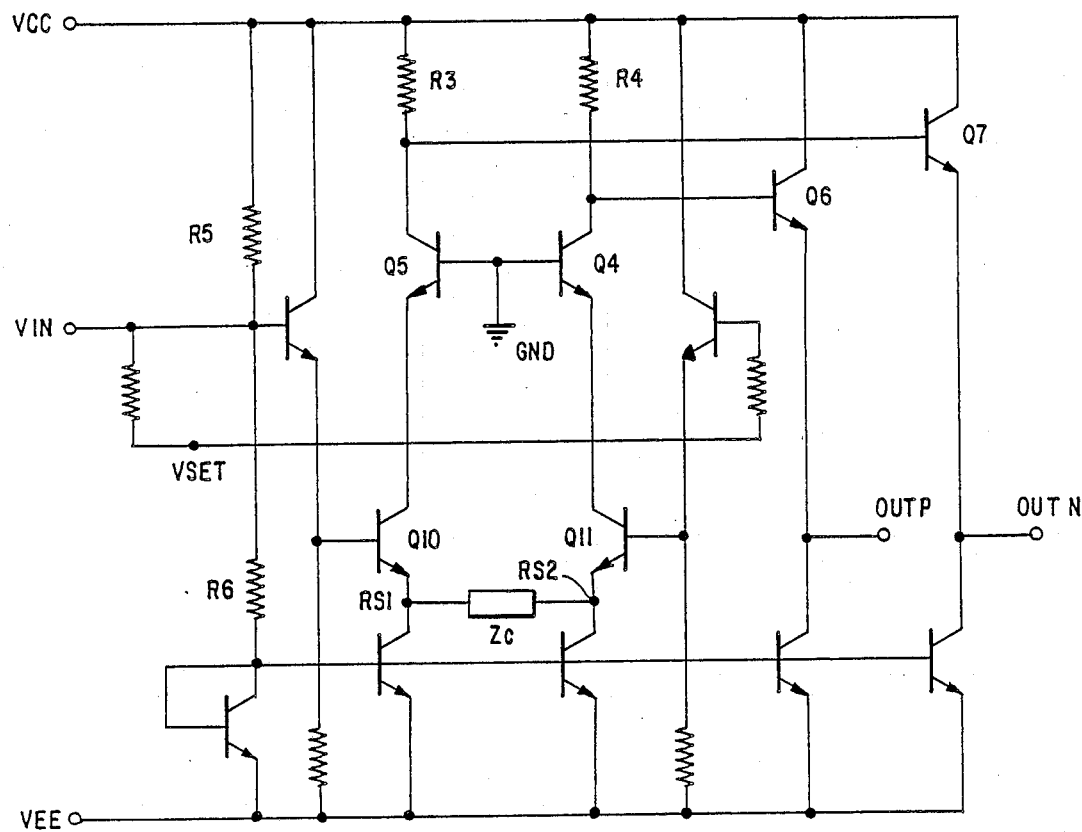
FIG. 5 is a circuit diagram of the line equalizer.

The equalizer EQU, the circuitry of which is shown in FIG. 5, consists of a differential amplifier, including transistors Q4 and Q5, with respective emitter follower (transistors Q6 and Q7), output stages with the outputs OUTP and OUTN. The inputs to the amplifier are also buffered with emitter followers. The differential amplifier is able to give a gain of a least 25dB at frequencies up to 30Mhz and has a gain of a least 0dB at 100MHz.

The inputs to the differential amplifier are tied to VSET via 5kOhm resistors. The DS3 signal is AC coupled to VIN, since this signal has no DC component the DC voltage at VIN will be controlled by VSET (−2.5 V). The −2.5V reference ensures that transistors Q10 and Q11 will not be saturated by the cascode transistors Q5 and Q4 clamping the maximum collector voltage of transistors Q10 and Q11 to −0.7 V. The single ended gain of the differential amplifier is determined by the impedance Zc between RS1 and RS2 and conforms to the following equations:

$$Vo1 = (Vset - Vin) * R5/(Zc + 2*re), R5 + 850 ohms \text{ nom.}$$

$$Vo2 = (Vin - Vset) * R6/(Zc = 2*re), R6 = 850 ohms \text{ nom.}$$

Where re, is the emitter resistance of transistors Q10 and Q11.

Note that if impedance Zc is high the differential amplifier will have no gain, therefore Zc will be AC coupled so that any DC offsets will have no effect at the output.

The cascode transistors Q4 and Q5 are used to eliminate the Miller multiplication of the collector base capacitance of transistors Q10 and Q11.

The output signals OUTP and OUTN of the equalizer stage EQU are AC coupled with external capacitors to the inputs of the slicer stage SL(FIG. 2).

Figure 6:
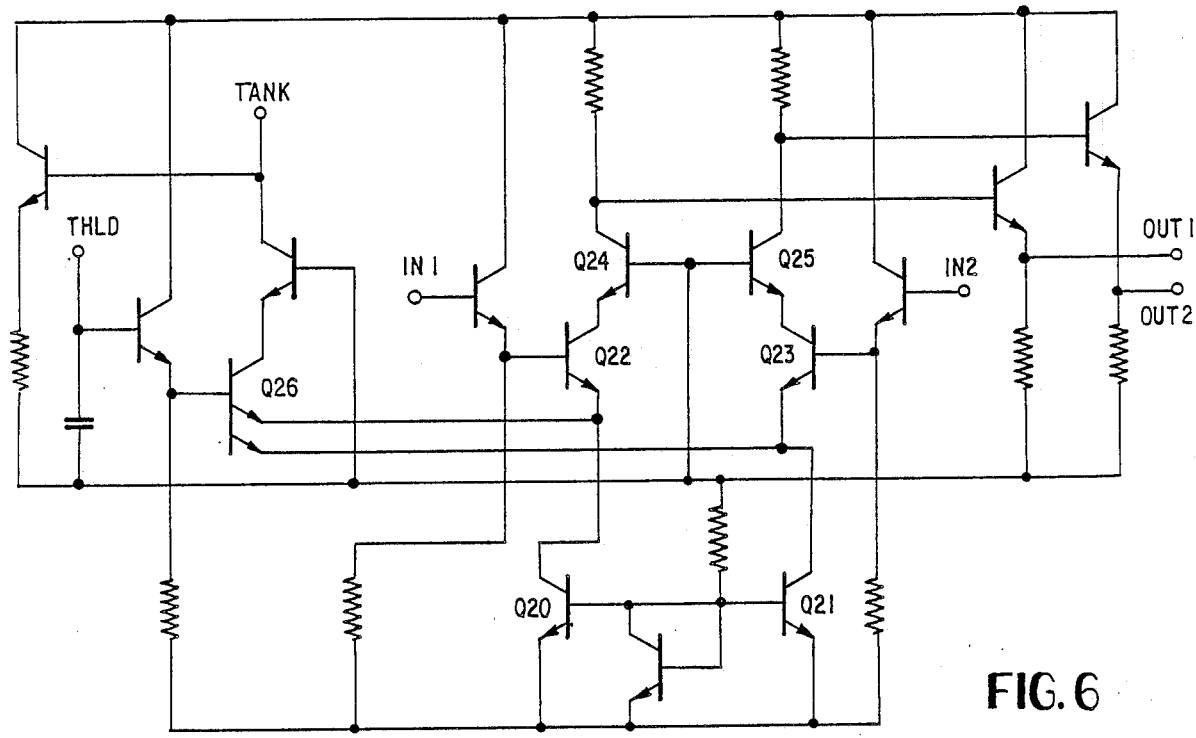
FIG. 6 is a circuit diagram of the slicer stage.

The slicer stage, shown in FIG. 6, compares the voltages OUTP and OUTN at IN1 and IN2 with the voltage at THLD. Normally the IN voltages are higher than the THLD voltage. Thus the currents set by transistors Q20 and Q21 flow through transistors Q22 and Q23 respectively thus pulling the voltage at the collectors of the cascode transistors Q24 and Q25 low, so that the outputs OUT1 and OUT2 will normally be at a logic low level.

When the voltage at IN1 goes more negative than the THLD voltage the current will flow through transistor Q26 from the TANK. The same occurs when the voltage at IN2 goes more negative than THLD.

Under normal operating conditions the IN voltages will only be more negative than THLD for about 11ns pulses at times that are integral multiples of the 22.353ns. These pulses will cause the TANK to ring at the data rate of the DS3 signal at the input. Since the TANK pin has a high AC impedance, each pulse of current will not have sufficient energy by itself to cause large phase changes. Therefore the phase of the recovered clock will be a short term average of the incoming signal phase, also that phase relationship can be adjusted slightly by tuning the tank center frequency. This phase adjustment capability is a useful feature, but makes it necessary to have a tank that is stable with temperature.

Figure 7:
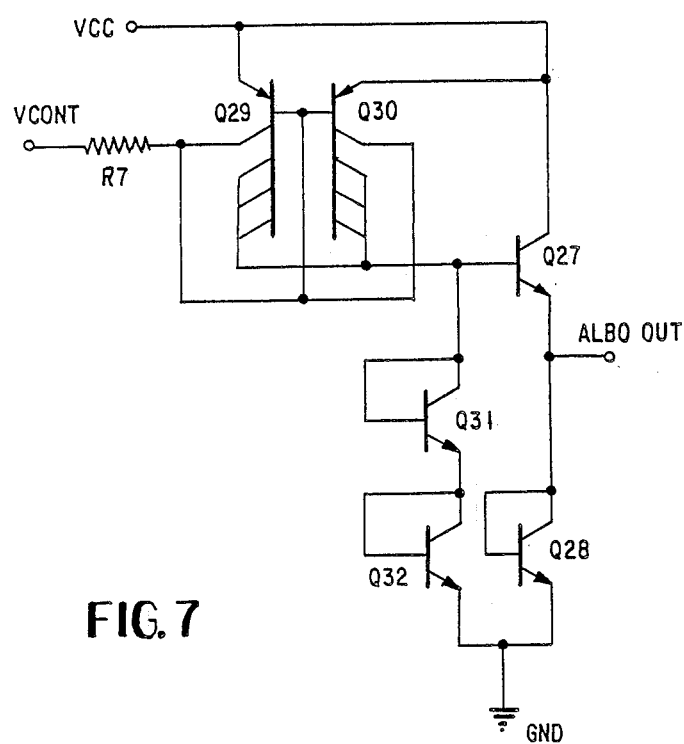
FIG. 7 is a circuit diagram of an automatic line build out network of the receiver.

The circuitry of the ALBO network is shown in FIG. 7. The ALBO variable impedance is controlled by passing a current through two diodes in series made by transistors Q27 and Q28. The current is set by the output voltage VCONT from the operational amplifier U4 shown in FIG. 2 forcing a current through resistor R7 which is mirrored by transistors Q29 and Q30 which in turn force that current through transistors Q31 and Q32. The voltage developed across transistors Q31 and Q32 will cause the same current to flow through transistors Q27 and Q28 while the impedance at the collector/base of transistor Q31 is reduced by the beta of transistor Q27 at the output, thus the AC impedance at the output of this circuit is the parallel combination of the emitter resistance of transistor Q27 and Q28. This parallel configuration helps cancel the distortion that a single diode would produce.

Figure 8:
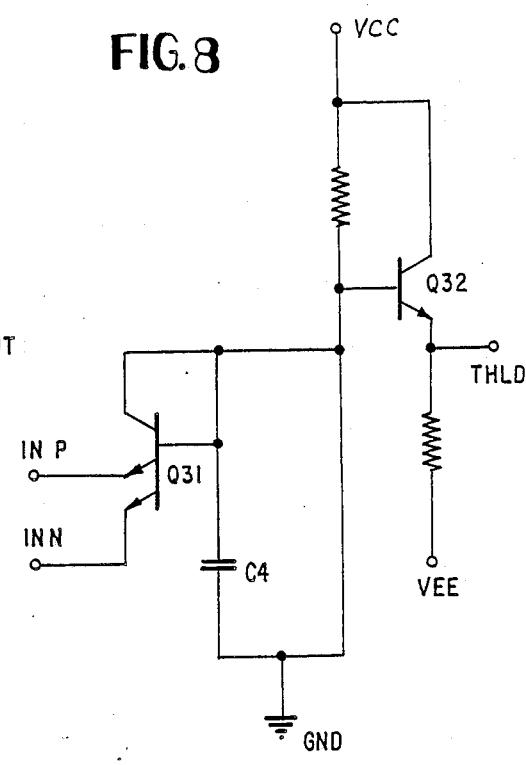
FIG. 8 is a circuit diagram of an equalizer level detector.

The equalizer level detector ELD, the circuitry of which is shown in FIG. 8 uses two diodes realized as a double emitter transistor Q31 with the base connected to the collector, to full wave rectify the output from the equalizer at points INP and INN (FIG. 2). The negative peak level is stored on capacitor C4 and a emitter follower Q32 outputs that level. The diode volt drop of transistor Q31 is cancelled by the Vbe of transistor Q32. For low level signals, the current through transistor Q31 is less than that though transistor Q32; thus the Vbe of transistor Q32 will be greater than the transistor Q31 drop and, this effect produces a level threshold of about 85mV below which the slicer will not detect any signal. The minimum expected signal level is 250mV.

The level output by THLD of transistor Q32 is compared with the average DC level of the equalizer output (FIG. 2). The difference between the equalizer negative peak level and its DC level is converted in to a positive voltage by operational amplifier U5. Which produces a positive voltage approximately equal to the peak AC level output of the equalizer. The positive equalizer level is compared with a reference voltage (EREF), nominally set to 500mV but can be adjusted using external resistors. The difference between the equalizer level and EREF is integrated by an integrator consisting of operational amplifier U4, capacitor C5, and resistor R8.

The output of the integrator completes the control loop. If the output from the equalizer is greater than EREF the integrator output will slowly go down, thus increasing the diode current in the ALBO circuit. The increased ALBO diode current will reduce the DS3 signal level until the output from the equalizer is 500mV. If the output from the equalizer is less than EREF the integrator output will slowly go up thus decreasing the diode current in the ALBO circuit. The decreased ALBO diode current will increase the DS3 signal level until the output from the equalizer is 500mV or the ALBO diode current is close to zero.

The ALBO and the equalizer networks are chosen so that when the ALBO diode current is at its maximum the attenuation and frequency response of the ALBO cancels the equalizer response. When the ALBO current is zero the circuit cancels the attenuation of approximately 1800 feet of cable to produce an overall, cable plus equalizer, response that is gaussian with a half neper point at 25MHz. neper=$\frac{1}{2}$ * Ln (Power in / Power out).

Figure 9:
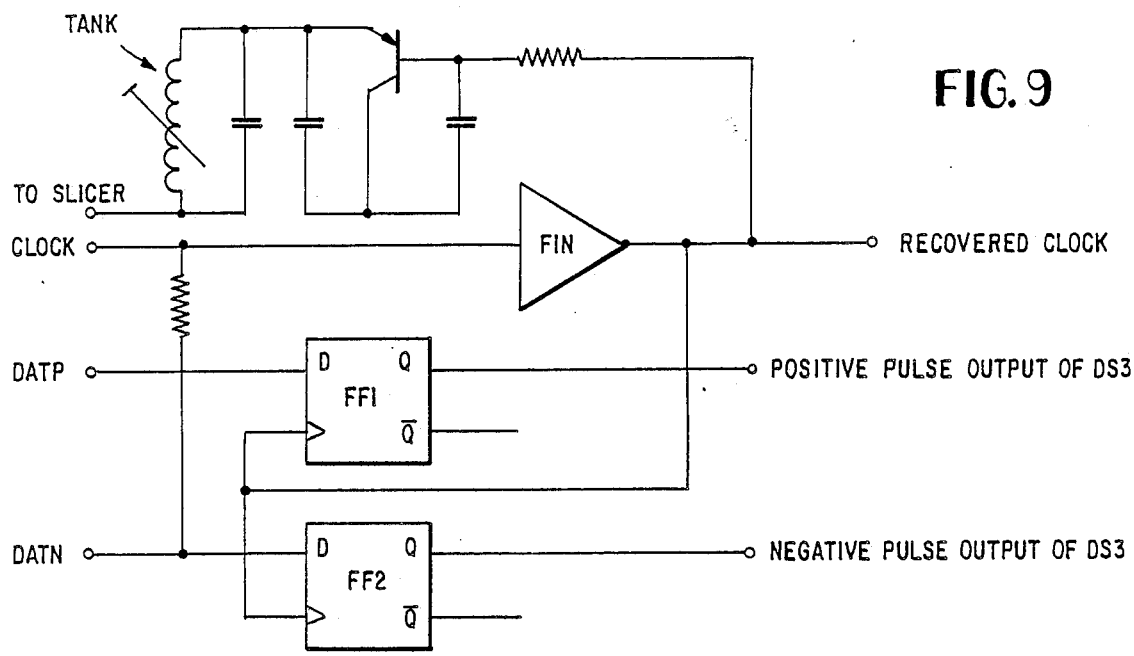
FIG. 9 is a circuit diagram of a tank circuit together with data retiming.

To retime received data, fast-flip-flops FF1 and FF2 (FIG. 9) are used. The :lock signal is passed through a fast inverter FIN and a filter that produces a DC bias. This bias voltage is adjusted by a diode drop and used to fix the clock tank center voltage to ensure a square clock signal.

Figure 10:
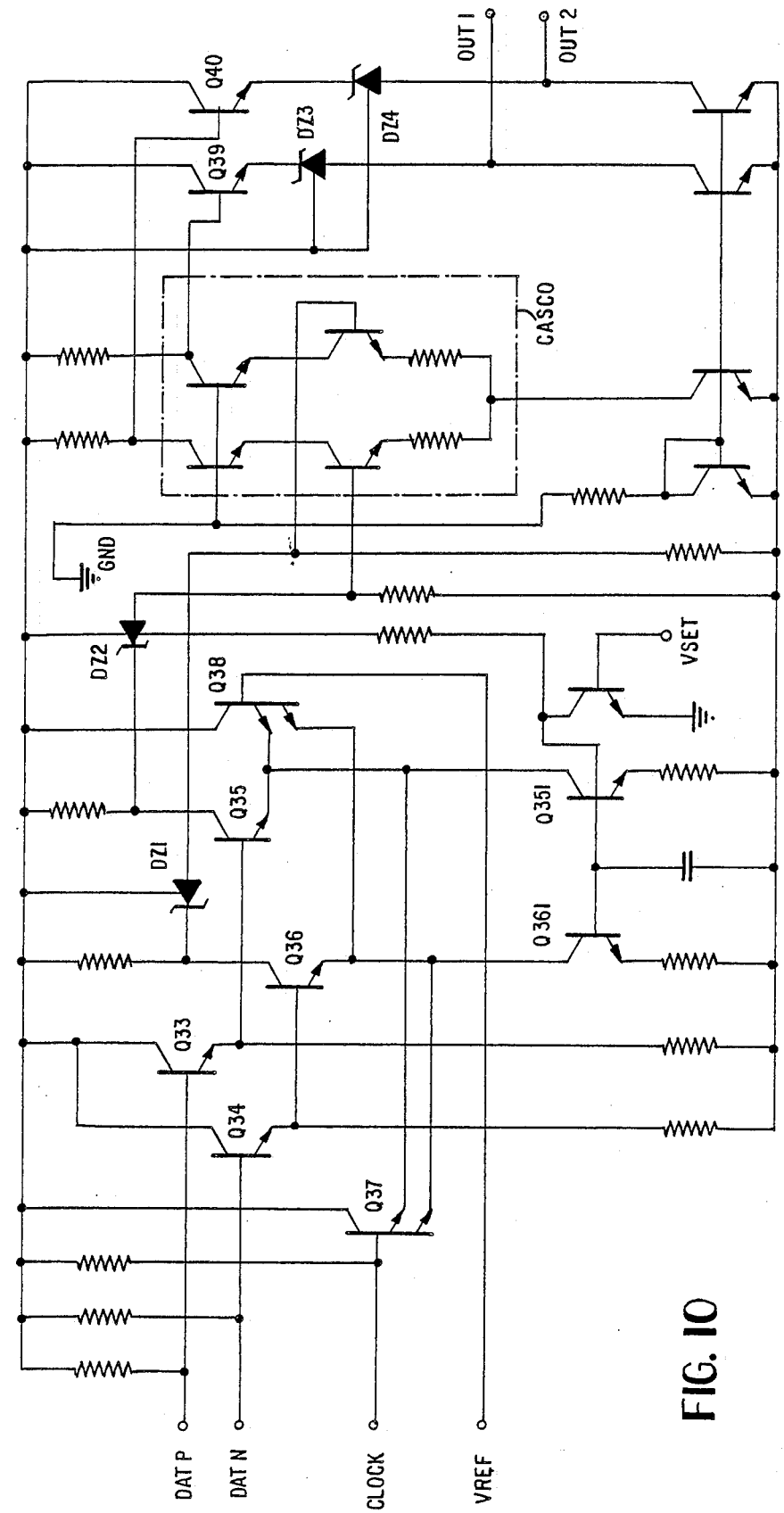
FIG. 10 is a circuit diagram of a data amplifier in the transmission path.

The circuit of data amplifier DAMP of the transmitter circuit (FIG. 3), is shown in FIG. 10 and consists of two stages:

Logic function that gives low pulse out when its input is high and the clock input is low, differential amplifier that combines the output from each logic element and amplifies them by about 9dB.

The logic inputs DATP and DATN are buffered by emitter followers Q33 and Q34. The Vbe voltage drops of the emitter followers prevent the saturation of transistors Q35 and Q36 when the data inputs reach VCC, and also allow the clock input CLK to dominate when it is also high.

When the clock signal CLK is high all the current from the sources, transistors Q351 and Q361, is taken by transistor Q37; thus the output voltage on both sides of the logic circuit will be high regardless of the data input levels DATP or DATN.

When the clock signal CLK is low no current flows through transistor Q37. If the DATP and DATN signals are lower than VREF+Vbe then all the current will flow through transistor Q38; thus the output voltage on both siges of the logic circuit will be high. If the level at DATP exceeds VREF+Vbe, then the current from transistor Q351 shall flow through transistor Q35 causing a low pulse at its output. Similarly if the level at DATN exceeds VREF+Vbe then the current from transistor Q361 will flow through transistor Q36 causing a low pulse at its output.

The output from both sides of the logic are shifted down in voltage by zener diodes DZ1 and DZ2 and fed into opposite sides of a cascoded differential amplifier CASCO having a gain of just under a factor of three. Both sides of the differential signal output from this differential amplifier are buffered by emitter follower transistors Q39 and Q40. The signals are then shifted down in voltage by zener diodes DZ3 and DZ4. The output signals OUT1 and OUT2 are then fed to the LBOS stage (FIG. 3).

Figure 11:
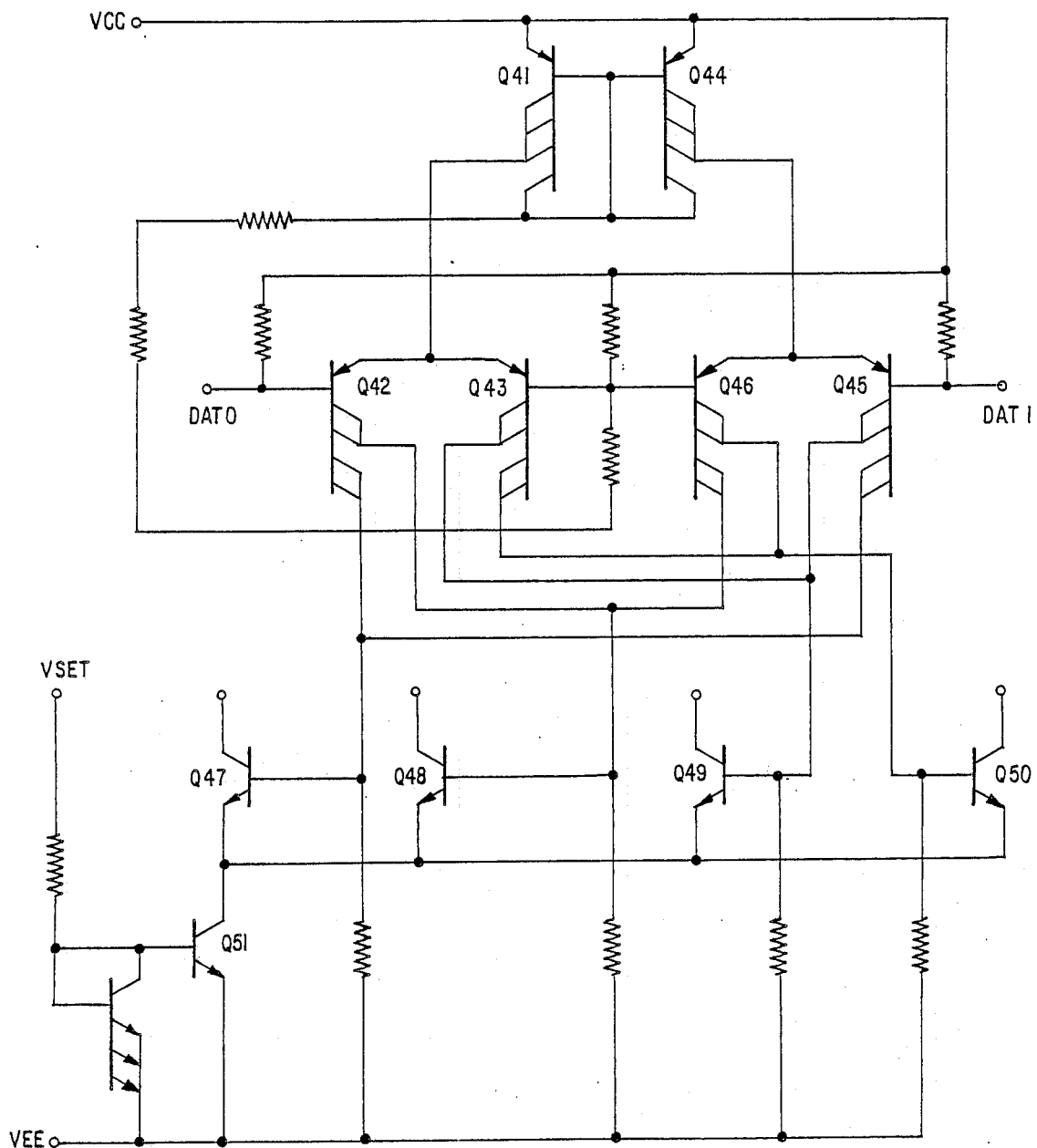
FIG. 11 is a circuit diagram of a binary to four line converter.

FIG. 11 shows the circuitry of the binary to 4 line converter BIFL of FIG. 3. Current supplied by transistor Q41 flows through transistor Q42 if the DATO input is lower than 2 volts and flows through transistor Q43 if the DATO input is higher than 3 volts. Similarly, current supplied by transistor Q44 flows through transistor Q45 if the DAT1 input is lower than 2 volts and flows through transistor Q46 if the DAT1 input is higher than 3 volts. Current flowing in transistors Q42, Q43, Q46 or Q45 is split into two parts each giving rise to eight current sources, four of which are on at any time. Transistors Q47, Q48, Q49 and Q50 have their bases supplied by two of the eight currents in such a way that a binary decode function is created. The transistor that has both its base current sources on takes all the current supplied by transistor Q51.

Figure 12:
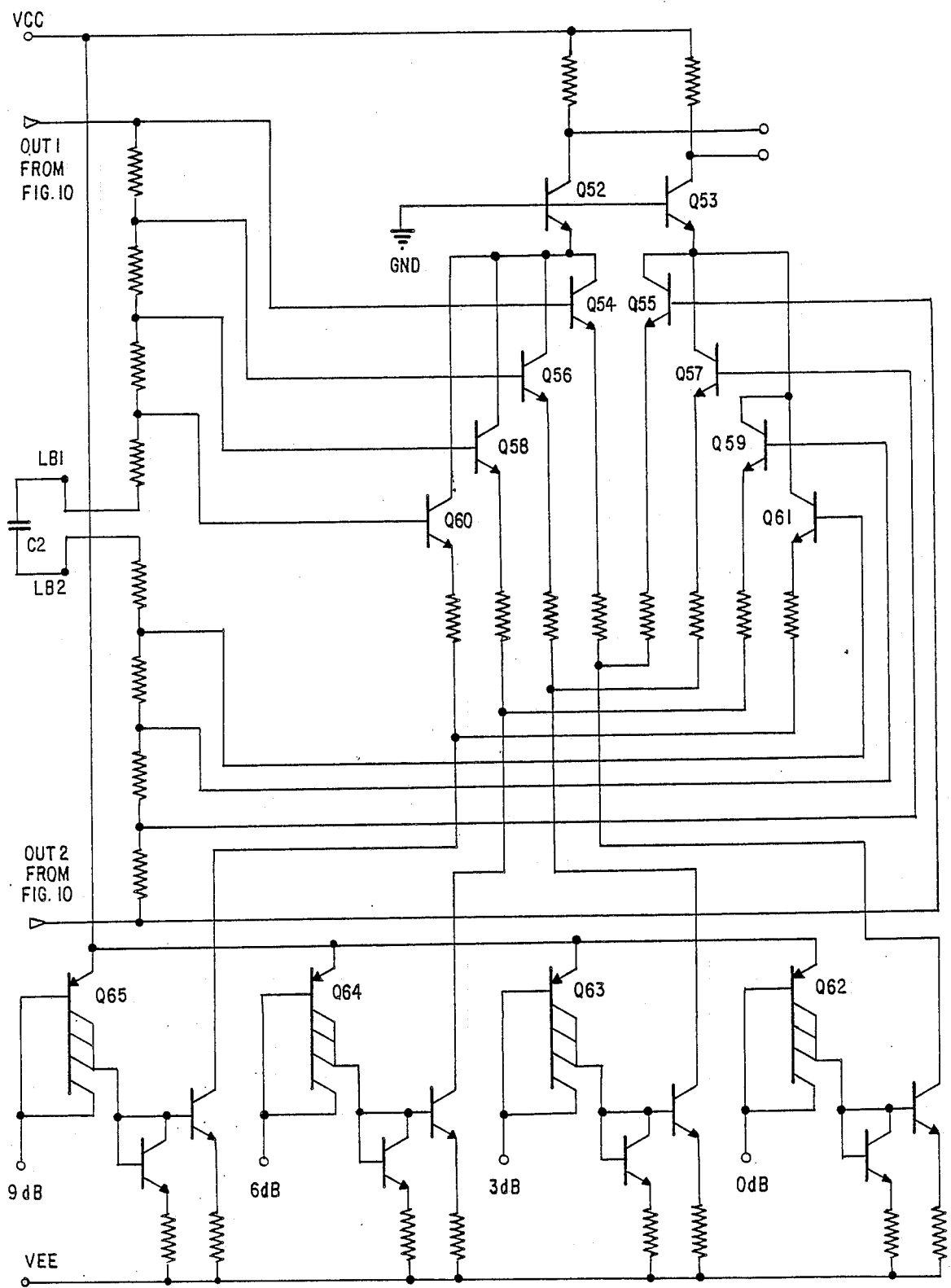
FIG. 12 is a circuit diagram of a line build out stage in the transmission path.

The LBOS stage of FIG. 3 is shown in details in FIG. 12. The differential signal, OUT1 and OUT2, comes into this block and feeds a resistive potential divider that has three taps. The potential divider response is set by an external capacitor C2 across terminals LB1 and LB2. Therefore at low frequencies all the taps shall have the same potential and at high frequencies the taps have the following attenuations of the input signal, 3dB, 6dB and 9dB. The differential input and all the attenuated taps then each go to a differential amplifier, with the collectors at each side commoned from each amplifier at the emitter of the cascode transistors Q52 and Q53. Only one of the differential amplifiers, transistors Q54-Q55, Q56-Q57, Q58-Q59, Q60-Q61, will be on at a time determined by the tail current from transistors Q62, Q63, Q64, Q65, being on. The circuit also provides approximately 6dB of gain.

Figure 13:
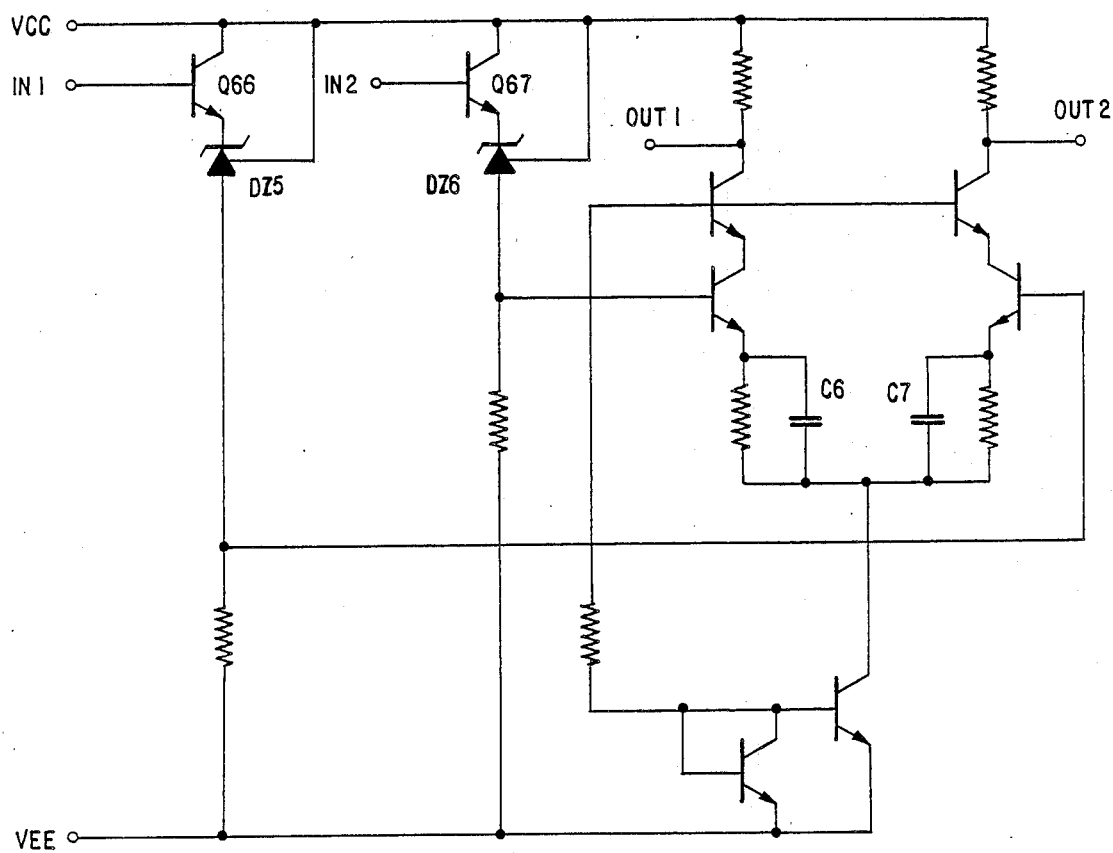
FIG. 13 is a circuit diagram of a signal amplifier in the transmission path.

The amplifier AMS (FIG. 3) shown in FIG. 13 is a conventional cascoded differential amplifier having a gain of 9.5dB. At high frequencies the gain is only 8.5dB at the signal level at which this circuit operates. The high frequency role off of the amplifier is extended by capacitors C6 and C7, each being about 4pf. The input to this circuit is buffered by emitter follower transistors Q66 and Q67 and the DC voltage is shifted by zener diodes DZ5 and DZ6.

Figure 14:
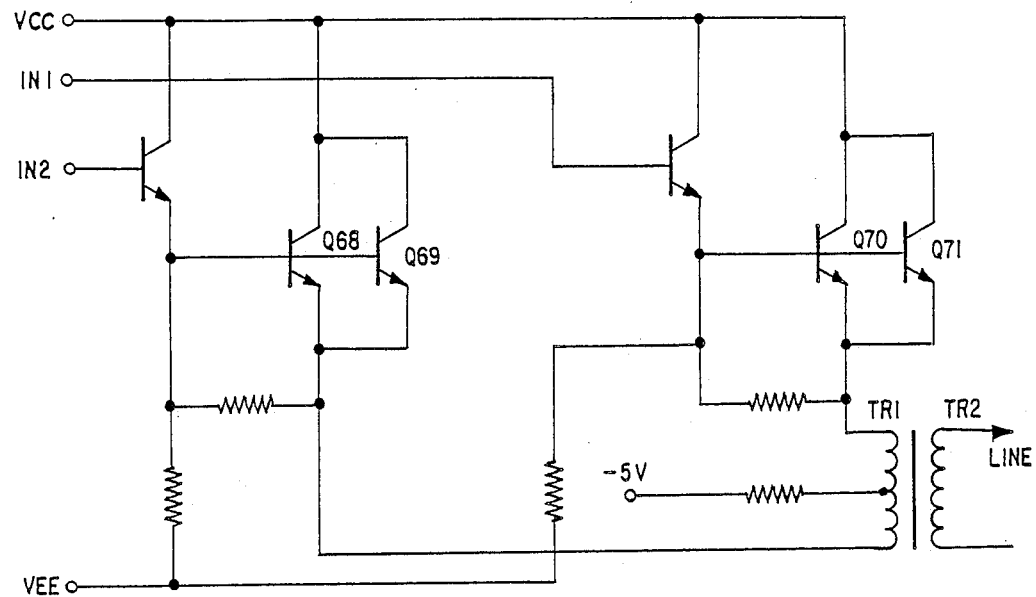
FIG. 14 is a circuit diagram of a line driver.
Figure 15:
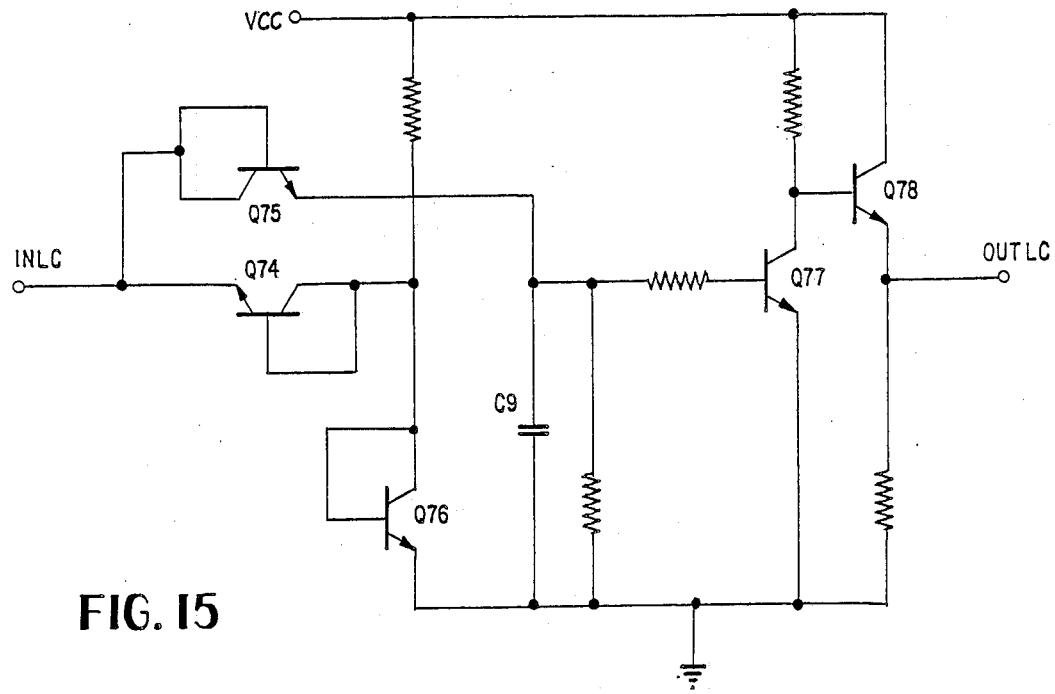
FIG. 15 is a circuit diagram of a loss of clock detector.

The line driver LIDR of FIG. 3 is shown in FIG. 14 and consists of two double emitter followers transistors Q68, Q69, Q70, Q71. Each side of the emitter followers drives the end of a center tapped transformer, TR1, TR2. This circuit can only source current into the transformer; however the voltage on one side is pulled low by the induced signal from the other side. The power transistors Q68, Q69; Q70, Q71 have gain even at large currents and thus are able to supply sufficient current to damage the metal tracks under short circuit conditions. Therefore care should be taken not to work on this circuit while power is applied. The recovered clock signal, after being squared (FIG. 9), is fed to a loss of clock detector LCD the circuitry of which is shown in FIG. 15. The recovered clock CL is AC coupled to the input INLC of this circuitry. Current flows out through a first diode, realized by transistor Q74, on negative going excursions of the clock and in through a second diode, realized by transistor Q75, on positive going excursions of the clock. The current going out of transistor Q74 is larger than that coming in through transistor Q75; thus a DC voltage will develop across the coupling capacitor C9 until the most negative the input to this circuit goes is about ground potential GND, since the volt drop across transistor Q74 is canceled by that across a third diode, realized by transistor Q76. The peak voltage, minus the voltage across transistor Q75, is stored on capacitor C9, which has one side connected between the output of transistor Q75 and the input of an emitter stage, transistor Q77, and has its other side connected to ground potential GND. The output of emitter stage transistor Q77 is connected to an emitter follower, transistor Q78.

If the voltage across capacitor C9 is sufficient to turn on transistors Q77 and Q78, the output OUTLC will go low, indicating clock is present.

It will be understood that the above description of the present invention is susceptible to various modifications, changes and adaptions, and the same are intended to be comprehended within the meaning and range of equivalents of the appended claims.

I claim:

1. Line interface circuit for binary data signals having a transmitter comprising:
    a binary data amplifier;
    a transmit line build out network providing a frequency dependent attenuation of the amplified binary data; and
    means, connected to said transmit line build out network, for controlling the frequency dependent attenuation characteristics of the line build out network according to a logic word representing a number of discrete attenuation values, with said means for controlling including; a binary to four line converter for converting a two bit logic voltage representing the logic word into a current on one of four lines, and
    a selecting stage for the line build out network to select one of four attenuations depending on the current on one of the four lines.

2. A line interface circuit for binary signals including a receiver provided with a signal input and means for providing compensation for varying lengths of line including a control loop which comprises:
    a line equalizer,
    a signal input circuit connected between said signal input of said receiver and the signal input of said line equalizer,
    a receive line build out network means for controlling said signal input circuit to cause a variable attenuation of an input signal fed to said line equalizer via said input circuit,
    means for monitoring the output level of said line equalizer, and
    means, responsive to said output level, for controlling said line build out network to reduce said attenuation when the output level of said line equalizer falls below a threshold; and wherein said line build out network includes:
    a network input terminal connected to the output of said means for controlling; a first circuit path, including the series connection of the collector-emitter path of a first transistor and a diode, connected between one pole of a source of operating potential and a point of reference potential; a second circuit path including a pair of series connected diodes connected between said point of reference potential and the base of said first transistor; a network output terminal connected to the common connection of said transistor and said diode of said first current path; and means, connected between said base of said first transistor and said source of operating potential and controlled by an input current caused by the output signal from said means for controlling at said network input terminal, for mirroring said input current and causing the mirrored current to flow through said second circuit path, whereby the current through said first circuit path is controlled by the voltage across said pair of series connected diodes.

3. A line interface circuit for binary data signals according to claim 2 further including a transmitter comprising:
    a binary data amplifier;
    a transmit line build out network, connected to the output of said amplifier, for providing a frequency dependent attenuation of the amplified binary data; and
    means for controlling the frequency dependent attenuation characteristics of said transmit line build out network according to a logic word representing a number of discrete attenuation values.

4. Line interface circuit as defined in claim 2 comprising:
    means for slicing the output signals of the line equalizer and for converting sliced signals into logic level signals,
    a clock tank circuit for recovering the clock of the binary data fed by current pulses which are derived from the logic level signals.

5. Line interface circuit as defined in claim 4 comprising:
    a fast flip-flop for retiming the binary data at the receiver's output.

6. Line interface circuit as defined in claim 4 comprising:
    means for fixing the clock tank center voltage by generating a bias voltage derived from the recovered clock.

7. A line interface circuit as defined in claim 2 wherein said signal input circuit includes: an input buffer stage having its input connected to said signal input terminal; a first resistor connected in series between the output of said buffer stage and said input of said equalizer; and a second shunt resistor having one end connected to said signal input of said equalizer and its other end connected via a capacitor to said output terminal of said line build out network.

8. A line interface circuit as defined in claim 2 wherein each of said diodes is formed by a respective bipolar transistor having its emitter collector path connected in the respective one of said first and second circuit paths and having its base connected to its collector.

9. A line interface circuit as defined in claim 8 wherein said means for mirroring includes a differential transistor stage.

10. A line interface circuit as defined in claim 9 wherein said differential transistor stage includes a pair of multicollector transistors having their respective emitters connected to said one pole of said source of operating potential; a resistor connecting said network input terminal to a collector and to the base of each of said pair of multicollector transistors; and a conductive connection between at least one further collector of each of said pair of multicollector transistors and said base of said first transistor.

11. A line build out network as defined in claim 10 wherein said pair of multicollector transistors are of one conductivity type and each of said transistors is of the opposite conductivity type.

12. A line interface circuit for binary data signals including a receiver provided with a signal input and means for providing compensation for varying lengths of line including a control loop which comprises:
    a line equalizer;

a signal input circuit connected between said signal input of said receiver and the signal input of said line equalizer;

means for monitoring the output level of said line equalizer, for comparing said output level with a threshold value and for providing a control signal as a result of the comparison;

and a receive line build out network means, which is responsive to said control signal and has its output connected to said signal input circuit, for increasing the signal level of an input signal to said line equalizer when said output level is below said threshold value and for decreasing said signal level of an input signal when said output level is above said threshold value, said receive line built out network including a first current path including the series connection of the emitter collector path of a bipolar transistor and a diode, a network output terminal connected to the common junction of said transistor and said diode, a further current path including a pair of series connected diodes having one end connected to one end of said first current path and to a point of references potential, means, having its output connected to said other end of said second current path and responsive to an input signal corresponding to said output signal, for producing a current corresponding to said output signal in said second current path, and means connecting the base of said transistor to said other end of said second current path.

13. A line interface circuit as defined in claim 12 wherein said signal input circuit includes an input buffer stage having its input connected to said signal input terminal; a first resistor connected in series between the output of said buffer stage and said input of said equalizer; and a second shunt resistor having one end connected to said signal input of said equalizer and its other end connected via a capacitor to said output terminal of said line build out network.

* * * * *